United States Patent [19]

Wistinghausen

[11] 4,059,779
[45] Nov. 22, 1977

[54] ELECTRIC MOTOR AND BRAKE ARRANGEMENT

[76] Inventor: Walter Wistinghausen, Bentweg 3, D-4930 Detmold 17, Germany

[21] Appl. No.: 682,990

[22] Filed: May 4, 1976

[30] Foreign Application Priority Data

May 7, 1975 Germany .............................. 2520285

[51] Int. Cl.[2] ............................................ H02K 7/102
[52] U.S. Cl. ........................................ 310/77; 310/78; 310/41; 192/8 R; 188/134
[58] Field of Search ................ 310/75 R, 75 D, 77, 310/78, 41; 188/134; 192/8 R

[56] References Cited

U.S. PATENT DOCUMENTS

| | | | |
|---|---|---|---|
| 1,741,215 | 12/1929 | Warshaw | 192/8 R |
| 1,824,150 | 9/1931 | Howe | 192/8 R |
| 2,449,020 | 9/1948 | Spraragen | 310/77 X |
| 2,755,396 | 7/1956 | Lee et al. | 310/77 |
| 3,068,975 | 12/1962 | Theyer | 192/8 R |
| 3,335,302 | 8/1967 | Van der Linden | 310/41 |

*Primary Examiner*—Donovan F. Duggan
*Attorney, Agent, or Firm*—Emory L. Groff, Jr.

[57] ABSTRACT

An electric motor and brake arrangement comprises an electric motor with a drive shaft for the motor and an output shaft for the arrangement, the output shaft carrying a radial supporting plate in which is provided a brake element with a brake shoe, the brake shoe being urged into contact with a brake drum associated with the casing by spring means and torque transmitting means on the drive shaft for transmitting torque to the brake element to release the brake, the brake element cooperating with stop means on the support plate for transmission of torque from the brake element thereto.

9 Claims, 5 Drawing Figures

ELECTRIC MOTOR AND BRAKE ARRANGEMENT

BACKGROUND OF THE INVENTION

The invention relates to an electric motor and brake arrangement having a mechanical brake operating automatically in a rotary direction, which is to be used for example for driving household spin dryers, lawnmowers or similar devices.

For the stated purpose the use of so-called stop brakes is known, in which the brake force is brought about by means of springs. In the simplest manner, hand or foot levers serve to ease these braking devices, however these levers require additional expense on operation, and thus are not suitable for heavier loads. The sought after automatic easing of the braking device therefore takes place largely with the aid of lifting magnets which are energised at the same time as the motor winding and thus remove the brake from operation during acceleration of the electric motor. These lifting electro magnets however represent very expensive components, which moreover are susceptible to faults and cause humming noises, if the magnet surfaces in contact are corroded.

It has become known from German Patent Specification No. 751 092 to provide automatically operating mechanical brake, said brake being eased by partial rotation of the rotor arranged on a hollow shaft pivotably surrounding the output shaft against a spring force causing the brake torque. The construction chosen for this in the known electric motor is above all designed for the drive of lifting apparatus and as a result is equipped for reversible braking operation. Therefore, the known braking device involves a considerable constructional expense, which would give rise to excessively high costs in relatively simple devices for which the subject of application is to be suitable.

SUMMARY OF THE INVENTION

It is an object of the invention to economize on these in order to be able to make available in this manner better driven machines at a more favourable expense. It is a further object of the invention to incorporate the braking device into the electric motor to such an extent that a closed and particularly space-saving construction results.

According to the invention, there is provided an electric motor and brake arrangement comprising an electric motor, a casing for said motor, a drive shaft for said motor, an output shaft for the arrangement, a support plate mounted on said output shaft for movement therewith and extending radially therefrom, a brake element mounted on said support plate, a brake drum associated with said casing, a brake shoe on said brake element for cooperating with said brake drum, spring means for urging said brake shoe into contact with said brake drum, torque transmitting means on said drive shaft for transmitting torque to said brake element in a direction to release said brake and stop means on said support plate engageable with said brake element for transmitting torque from said brake element to said support plate.

BRIEF DESCRIPTION OF THE DRAWINGS

The invention will now be described in greater detail, by way of example, with reference to the drawings, in which.

DESCRIPTION OF THE PREFERRED EMBODIMENTS

According to a preferred embodiment of the invention, it is proposed that in an arrangement as mentioned at the outset a radially directed support plate be fastened on to the output shaft, on which a spring-loaded brake element which is equipped with a brake shoe abutting the inner face of a brake drum adjacent the motor casing is mounted so as to be movable against a stop of the support plate, on to which element a torque transmission member connected to the hollow shaft of the rotor acts such that the brake element is initially moved away from the brake drum radially when starting up the electric motor while overcoming the spring force introducing the brake torque. Only after reaching its stop on the support plate is this brake drum and thus the drive shaft set in rotation, until, after switching off the electric motor, the brake shoe of the spring-loaded braking element is again forced against the brake drum. In a preferred refinement of the subject of application the braking element should thus also be supported symmetrically on both sides on the support plate in order to avoid bonding couples with respect to the pivot on the support plate. Similarly, the brake drum may be constructed as a part of the motor casing or may be arranged outside the motor casing. Furthermore, in modification of the concept of the invention it is recommended that the brake drum or the motor casing should be mounted so as to be pivotable to a limited extent and, in order to operate signal or locking devices during the braking process, the brake drum or the motor casing should also be carried by the braking element in the direction of rotation of the motor for as long as the brake element transmits brake power to the brake drum.

With the invention, it has become possible to create an electric motor having a mechanical brake operating automatically in a rotary direction, and which, as distinct from the initially described state of the art, manages with fewer and cheaper constructional parts. In addition, a mode of construction was achieved which takes into account the limited space available in household devices so that the concentrically arranged braking system does not subtantially increase the dimensions of the electric motor. Finally, the braking device in accordance with the invention may be regarded as extremely easy to repair because of the simple components for its construction. Lastly, this is above all because its possible replacement only brings about low costs in each case.

Figure 1:
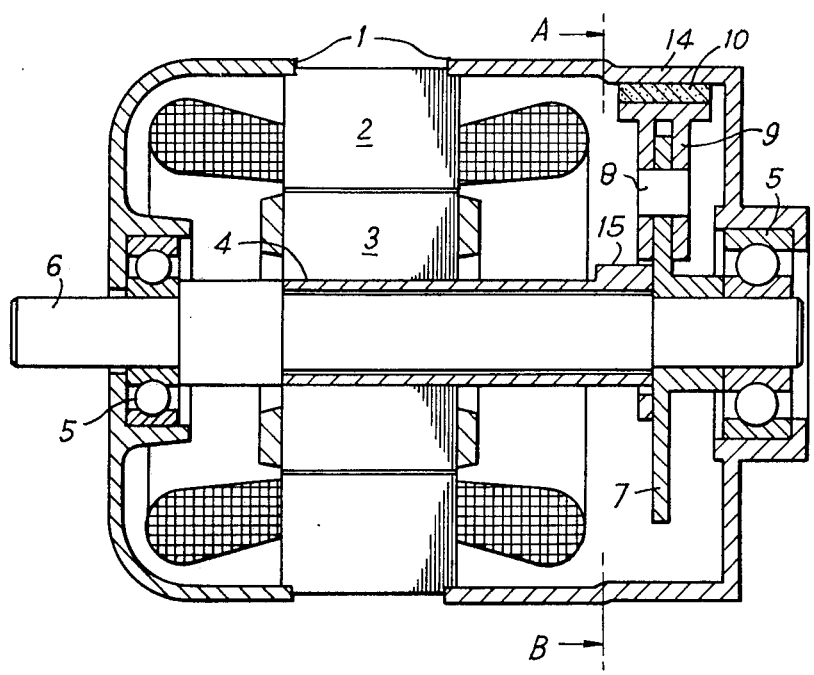
FIG. 1, shows the axial section through an electric motor in accordance with the invention.
Figure 2:
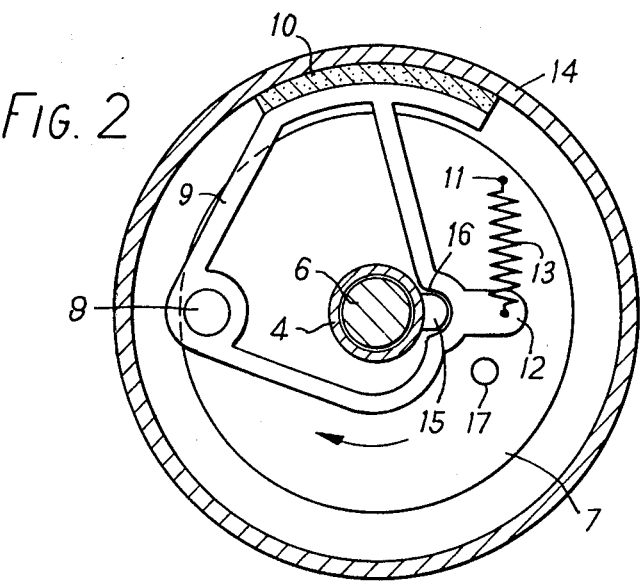
FIG. 2, shows a section taken on the line A-B of FIG. 1, showing a view of the braking device of the electric motor of FIG. 1.

Referring now to the drawings, the electric motor depicted in FIGS. 1 and 2 has a stator 2 arranged in a motor housing 1 having two parts, in which stator a rotor 3 rotates. This rotor 3 is arranged on a hollow shaft 4, which rotatably surrounds an output shaft 6 inserted in ball bearings 5.

Fixed on to the output shaft 6 is a radially arranged disc shaped support plate 7 on which a brake element 9 is mounted, said brake element 9 being supported on the support plate 7 symmetrically on both faces and being movable on a pin 8 passing through the support plate 7. This brake element 9 is equipped with a brake shoe 10 which, when the electric motor is stationary, is pressed against the inner face of a brake drum 14 constructed as part of the motor housing 1 with the aid of a tension spring 13 suspended at one end in a hook 11 of the support plate 7 and with the other end in a projection 12 of the brake element 9.

The arrangement and mounting of the brake element 9 is selected so that during the braking process a servo action takes place so that the tension spring 13 may be constructed so as to be appropriately weak and thus only small forces are required in order to ease the brake.

The support plate 7 and the brake element 9 mounted thereon serve at the same time to transmit the moment of rotation produced by the rotor 3 to the output shaft 6, so that a pin 15 standing proud of the hollow shaft 4 engages in an appropriate guide 16 of the brake element 9. When the electric motor is set in operation and as soon as the rotor 3 and thus the hollow shaft 4 begins to rotate then the brake element 9 moves, via the pin 15, in the direction of rotation of the rotor 3 against the force of the tension spring 13 and thus the brake shoe 10 removed from the brake shoe 14. If after this partial rotation of the rotor 3, the projection 12 of the brake element 9 has reached a stop 17 located on the support plate 7, then the support plate 7 follows and thus sets the output shaft 6 in rotation. When disconnecting the electric motor, the force exercised by the tension spring 13 on the brake element 9 again becomes effective, whereupon the brake element 9 again abuts the brake drum 14 with its brake shoe 10.

Figure 3:
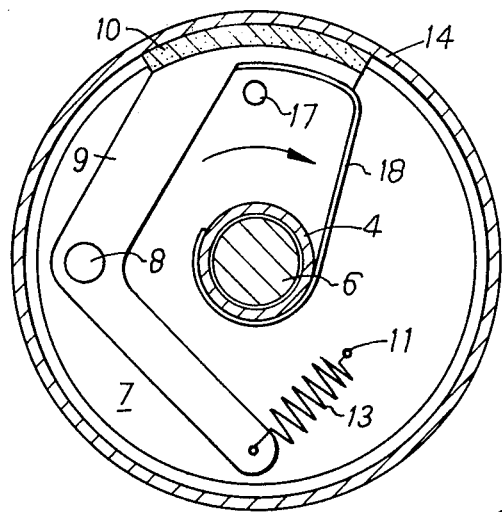
FIG. 3, shows a modification of the braking device shown in FIG. 2.
Figure 4:
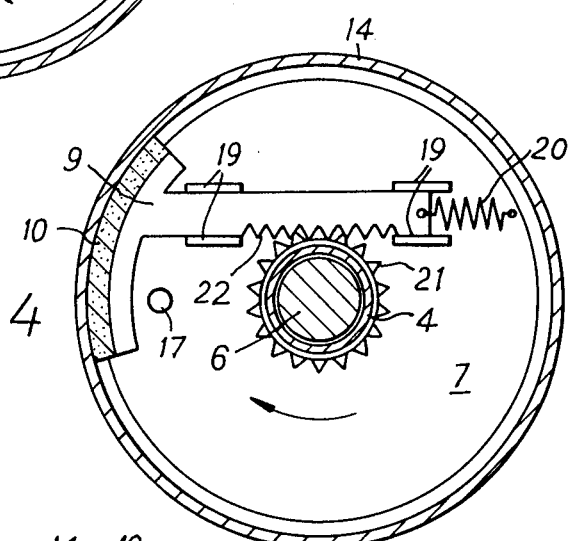
FIG. 4, shows a further modification of the braking device shown in FIG. 2.

In FIGS. 3 and 4, different possibilities for embodying the braking device of the electric motor from that of FIG. 1 are shown. The distinction as opposed to the braking device which may be seen from FIG. 2 constitutes in the case of FIG. 3 the fact that the brake element 9 is formed as a lever and is connected to the hollow shaft 4 by means of torque transmitting member constructed as a spring clip 18. This spring clip 18 assumes the function of the pin 15 in FIG. 2 and when the electric motor starts, in turn causes release, the brake element 9 equipped with the brake shoe 10 from the brake drum 14 which takes place against the force of the tension spring 13 engaging against the support plate 7 and causes the support plate 7 and the drive shaft 6 to follow on when the brake element 9 comes into contact with the stop 17.

In the braking device shown in FIG. 4, the brake element 9 carrying the brake shoe 10 is displaceably mounted between guides 19 arranged on the support plate 7 and is held in engagement with the brake drum 14 by means of a compression spring 20. A toothed gear 21 is fastened to the hollow shaft 4 as a torque transmission member, which co-operates with teeth 22 on the brake element 9. The toothed gear 21 moves the brake element 9 radially away from the brake drum 14 when the electric motor is set in operation and after the stop 17 reaches the support plate 7 the torque is transmitted to the drive shaft 6.

In modification of the described embodiments, it would be conceivable to mount the brake drum 14, and possibly the motor housing 1 together with it, so as to be pivotable to a restricted degree, whereby the brake drum 14 or the motor housing 1 would be carried on by the transmitted brake power in the direction of rotation of the motor when the electric motor is disconnected. This movement could be exploited, for example, for operating a locking device for the cover of a household spin dryer driven by the electric motor in accordance with the invention, which locking device could only be released when the moving parts are absolutely stationary.

Figure 5:
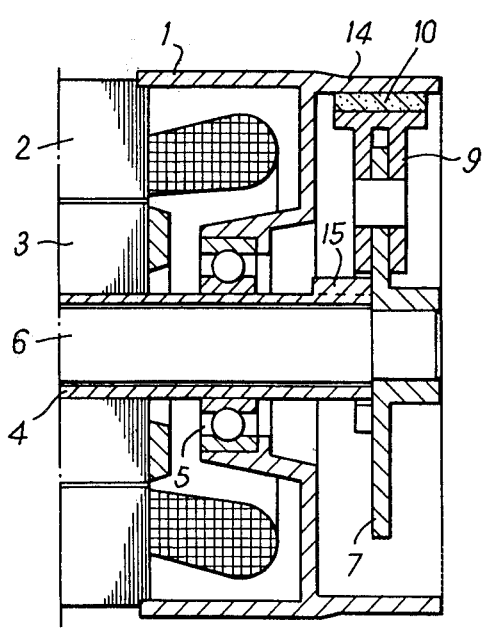
FIG. 5, shows a construction of the electric motor which differs from that of FIG. 1.

The construction of the electric motor shown in FIG. 5 varies from FIG. 1 by the brake drum 14 being arranged outside the motor housing 1. In this case, the right-hand ball bearing 5 would have to be seated on the hollow shaft 4 in order to be able to engage, with its pin 15, into the support plate 7 located together with the brake element 9, also outside the motor housing 1.

It will be understood that the above description of the present invention is susceptible to various modification changes and adaptations.

What is claimed is:

1. An electric motor and brake arrangement comprising an electric motor, a casing for said motor, a drive shaft for said motor, an output shaft for the arrangement, a support plate mounted on said output shaft for movement therewith and extending radially therefrom, a brake element mounted on said support plate, a brake drum associated with said casing, a brake shoe on said brake element for co-operating with said brake drum, spring means for urging said brake shoe into contact with said brake drum, torque transmitting means on said drive shaft for transmitting torque to said brake element in a direction to release said brake and stop means on said support plate engageable with said brake element for transmitting torque from said brake element to said support plate.

2. An arrangement as defined in claim 1, wherein said drive shaft comprises a hollow shaft surrounding said output shaft for rotation relative to said output shaft.

3. An arrangement as defined in claim 2, and comprising means for supporting said brake element on both sides symmetrically against said support plate.

4. An arrangement as defined in claim 2, wherein said brake drum is formed as a part of said motor casing.

5. An arrangement as defined in claim 2, wherein said brake drum is arranged outside said motor casing.

6. An arrangement as defined in claim 2, and comprising means for mounting said brake drum for restricted rotational movement, means for carrying said brake drum in the direction of rotation of said motor through said braking element and indication means for providing an indication as long as brake power is transmitted to said brake drum.

7. An arrangement as defined in claim 6, wherein said indication means comprises a locking device.

8. An arrangement as defined in claim 2, and comprising means for mounting said motor casing for restricted rotational movement, means for carrying said motor casing in the direction of rotation of said motor through said braking element and indication means for providing an indication as long as brake power is transmitted to said motor casing.

9. An arrangement as defined in claim 8, wherein said indication means comprises a locking device.

* * * * *